(12) United States Patent
Tinucci et al.

(10) Patent No.: US 6,850,685 B2
(45) Date of Patent: Feb. 1, 2005

(54) TERMINATION PANEL WITH PIVOTING BULKHEAD AND CABLE MANAGEMENT

(75) Inventors: Thomas Tinucci, Eden Prairie, MN (US); Wayne Giesen, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/109,576

(22) Filed: Mar. 27, 2002

(65) Prior Publication Data

US 2003/0185535 A1 Oct. 2, 2003

(51) Int. Cl.[7] .............................................. G02B 6/00
(52) U.S. Cl. ..................................................... 385/134
(58) Field of Search ................................. 385/135, 134, 385/53, 76, 77, 136, 137, 147

(56) References Cited

U.S. PATENT DOCUMENTS

| | | | |
|---|---|---|---|
| 4,792,203 A | 12/1988 | Nelson et al. | 350/96.2 |
| 4,995,688 A | 2/1991 | Anton et al. | 350/96.1 |
| RE34,955 E | 8/1996 | Anton et al. | 385/53 |
| 5,946,440 A | 8/1999 | Puetz | 385/135 |
| 6,215,938 B1 | 4/2001 | Reitmeier et al. | 385/135 |

FOREIGN PATENT DOCUMENTS

| | | |
|---|---|---|
| WO | WO 00/52504 A3 | 9/2000 |
| WO | WO 00/75706 A2 | 12/2000 |

OTHER PUBLICATIONS

ADC Telecommunications, Inc., "FL2000 Products", 803, Dec., 2000, 32 pages.
ADC Telecommunications, Inc., "Network Connectivity Solutions", M143, Feb. 2001, front cover, table of contents (2 pages), pp. 42–147, back cover.

*Primary Examiner*—Javaid H. Nasri
(74) *Attorney, Agent, or Firm*—Merchant & Gould PC

(57) ABSTRACT

The present invention relates to a module for terminating and connecting optical fiber telecommunications cables including connection locations located on a bulkhead pivotably mounted to an open front of a housing. The bulkhead also includes a cable management structure which moves with the bulkhead as the bulkhead pivots. The module may be mounted to a telecommunications equipment rack directly mounting locations on vertical supports of the rack Alternatively, the module may be mounted to a telecommunications equipment rack in concert with a cable slack storage structure which also fits between the vertical supports of the rack and which provides a mounting location for mounting the module. A plurality of modules may be mounted to the telecommunications equipment rack and cable guides mounted to the side of each module cooperate to define a vertical cable channel for directing telecommunications cables to a and from each of the modules mounted to the rack. A method of loading cables into a connection module including extending the cable into the interior of the module and through a cable route to a pivotably mounted bulkhead to which is mounted a cable management structure and from the cable management structure to a connection location on the bulkhead.

27 Claims, 21 Drawing Sheets

US 6,850,685 B2

TERMINATION PANEL WITH PIVOTING BULKHEAD AND CABLE MANAGEMENT

FIELD OF THE INVENTION

The present invention relates to termination panels with a movable bulkhead for connecting telecommunications cables.

BACKGROUND OF THE INVENTION

In telecommunications infrastructure installations, equipment for switching, cross-connecting and inter-connecting a variety of devices is used. Much of these devices are installed in telecommunications equipment racks to permit organized, high-density installations to be achieved in limited space available for equipment. Due to the increasing demand for telecommunications system capacity, it is desirable to increase the density of connections within a given space that can be achieved. Commensurate with the demand for increased capacity from the same installation footprint is a desire to improve the organization and handling of the cables used to link the equipment within the installation and the outside plant and facilities cables.

One approach to increasing system capacity within an installation is the use of higher speed, higher capacity telecommunications cables, whether copper or optical fiber. These higher speed, higher capacity cables require that more strict minimum bend radius protections are in place to maintain data flow. Improvements to the ability of the equipment within a telecommunications installation to provide bend radius protection are desirable.

SUMMARY OF THE INVENTION

The present invention relates to a connection module for telecommunications cables including a housing having an open front to which is mounted a movable bulkhead pivoting about a vertical axis and movable between an open and a closed position. The bulkhead includes connection locations for connecting cables on a first side of the bulkhead with cables on a second side of the bulkhead. Mounted to the rear of the bulkhead is a cable management and slack storage structure which moves with the bulkhead.

The present invention further relates to a telecommunications equipment rack to which is mounted a connection module for connecting telecommunications cables, the module including a bulkhead pivotably mounted within an open end of a housing. A plurality of connection locations are mounted to the bulkhead for connecting telecommunications cables. The module includes cable guides mounted to sides of the module which direct cables to and from the module. A cable management and slack storage structure is mounted to the rear of the bulkhead and moves with the bulkhead.

The present invention also relates to a telecommunications equipment rack with vertical supports with a connection module and a slack storage panel mounted to the rack.

The present invention further relates to a method of loading a telecommunications cable into a connection module by pivoting open a bulkhead with a plurality of connection locations. The cable is extended through an opening in one side wall, around the interior of the housing in a cable route to a second side wall adjacent the pivot axis of the bulkhead. From the cable route the cable is directed to a bulkhead mounted cable management structure and to one of the connection locations on the bulkhead, and the bulkhead is pivoted closed.

A variety of advantages of the invention will be set forth in part in the detailed description that follows and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Figure 1:
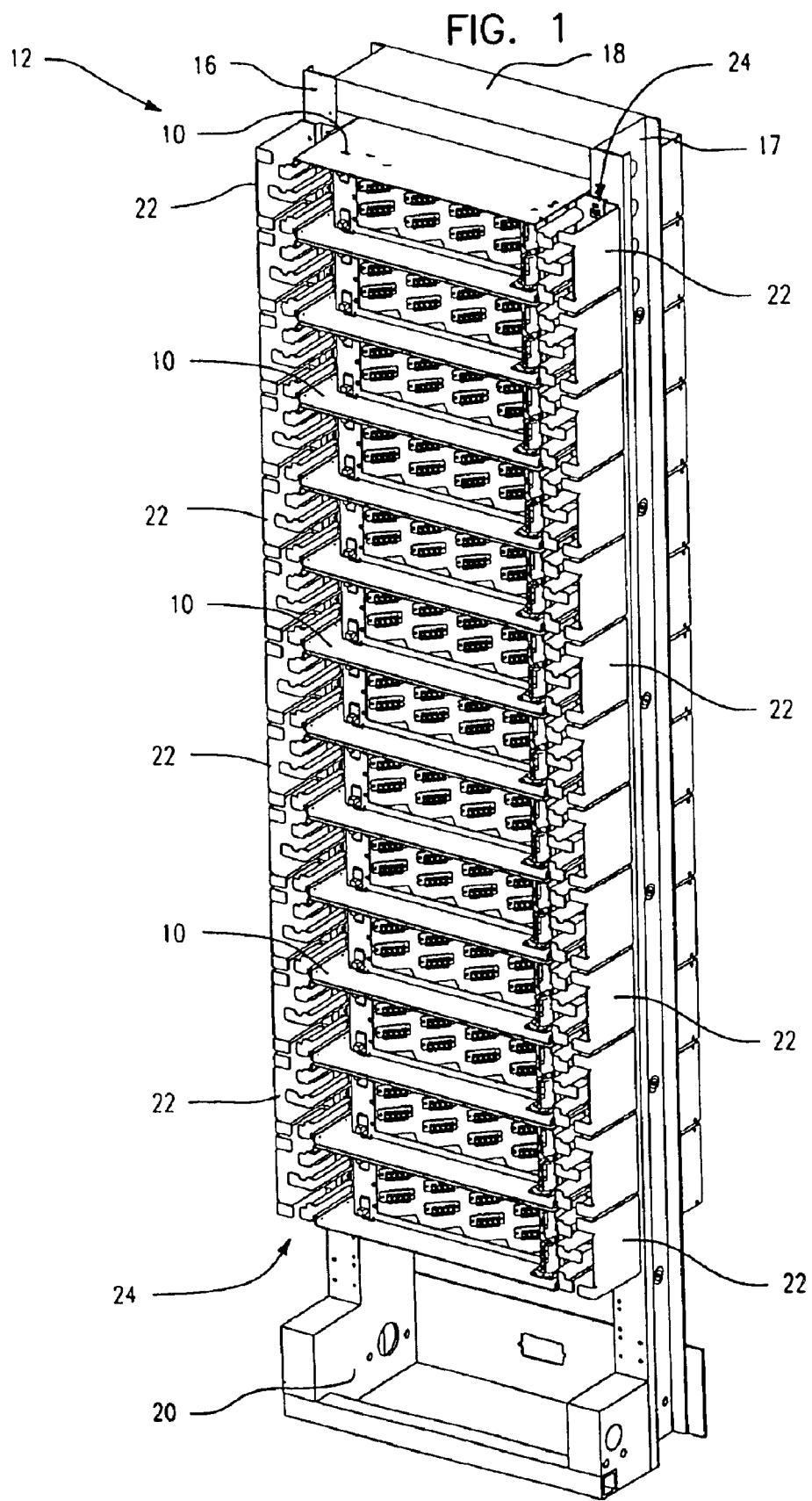
FIG. 1 is a perspective view of a first embodiment of a telecommunications equipment rack in accordance with the present invention.
Figure 2:
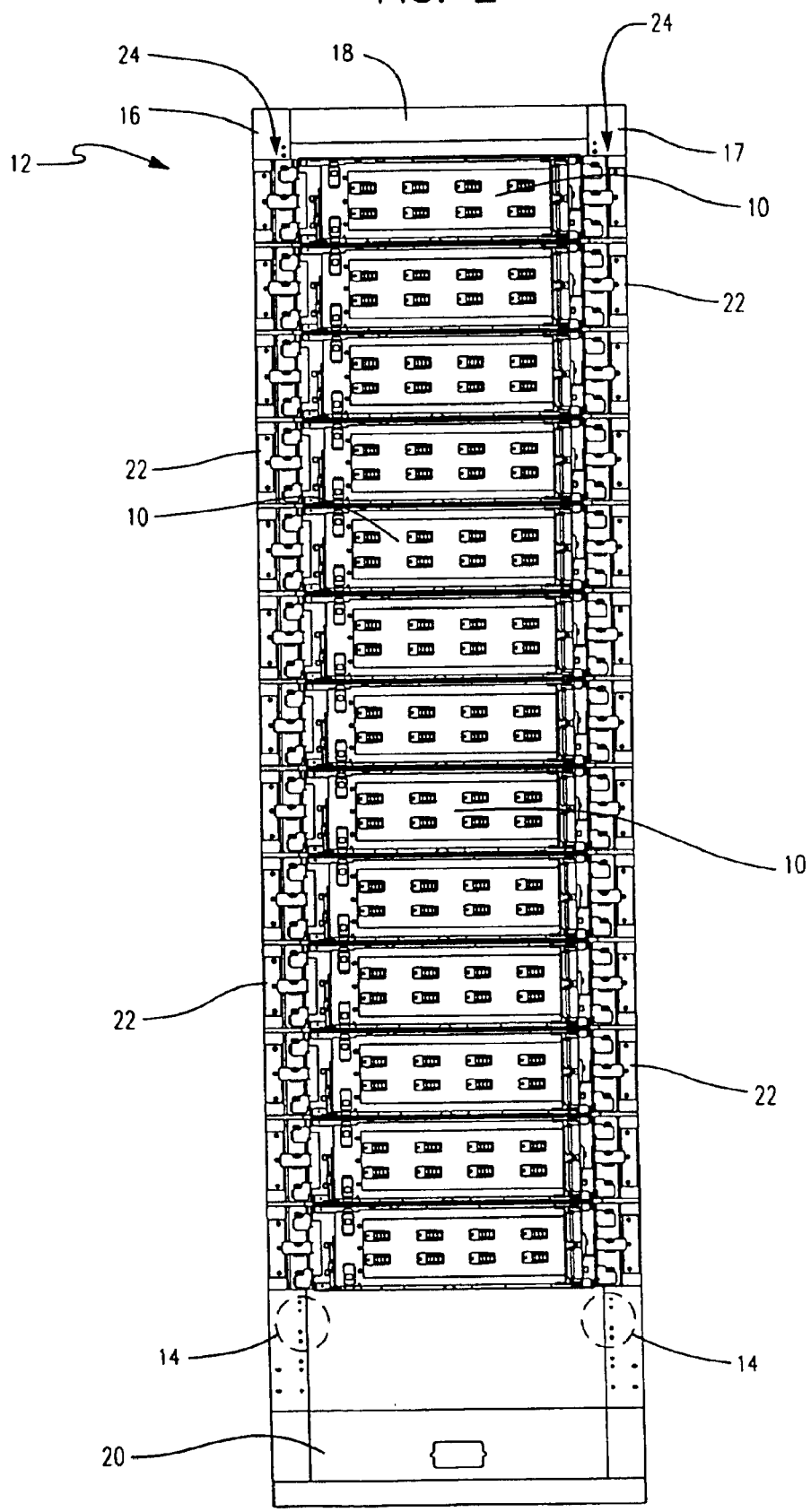
FIG. 2 is a front view of the equipment rack of FIG. 1.

Reference will now be made in detail to the exemplary aspects of the present invention that are illustrated in the accompanying drawings. Wherever possible, the same reference numbers will be used throughout the drawings to refer the same or like parts.

In a telecommunications equipment installation, outside plant cables and facilities cables are linked, allowing connectivity between users whom the installation might serve and overall telecommunications infrastructure. A variety of devices, such as interconnect module 10, and cross-connect modules, might be used to accomplish this linking and allowing efficient operation and configuration of the installation environment. These modules may be mounted in a telecommunications equipment rack, such as rack 12. Interconnect modules 10 include one or more connection locations for linking an outside plant cable and a patch cord or intra-facility cable linked to a piece of fiber optical terminal equipment. While the detailed description below describes an interconnect module 10, the same design and principles of the invention may be applied to a cross-connect module.

Referring now to FIGS. 1 through 4, telecommunications equipment rack 12 includes a plurality of mounting locations 14 for mounting inter-connect modules 10. Mounting locations 14 are located along a pair of vertical supports 16 and 17, located on either side of rack 12. Vertical supports 16 and 17 are joined and spaced apart by a top 18 and a bottom 20. Along each side each module 10 are vertical cable guides 22. Each guide 22 is aligned guide 22 of the immediately adjacent modules 10 to form a vertical cable channel 24 along both vertical supports 16 and 17. Additional details regarding guides 22 are included below in the detailed discussion of module 10.

Referring now to FIGS. 5 through 9, an alternative telecommunications equipment rack 26 is shown which includes an interbay slack storage panel 28 comprising several spools 30. By having panel 28 mounted between vertical supports 16 and 17, rack 26 can provide slack storage for telecommunications cables on rack 26 without extending beyond the footprint of bottom 20. Rack 26 is also adapted to mount several modules 10 between vertical supports 16 and 17 at mounting locations 14 along support 16 and along structure 28. The arrangement of mounting locations 14 on structure 28 is shown in the enlarged view of FIG. 9. Located along bottom 20 of rack 26 is a trough 34 defining a horizontal cable channel 36. A similar trough 34 could be mounted on bottom 20 of rack 12 as well.

Figure 10:
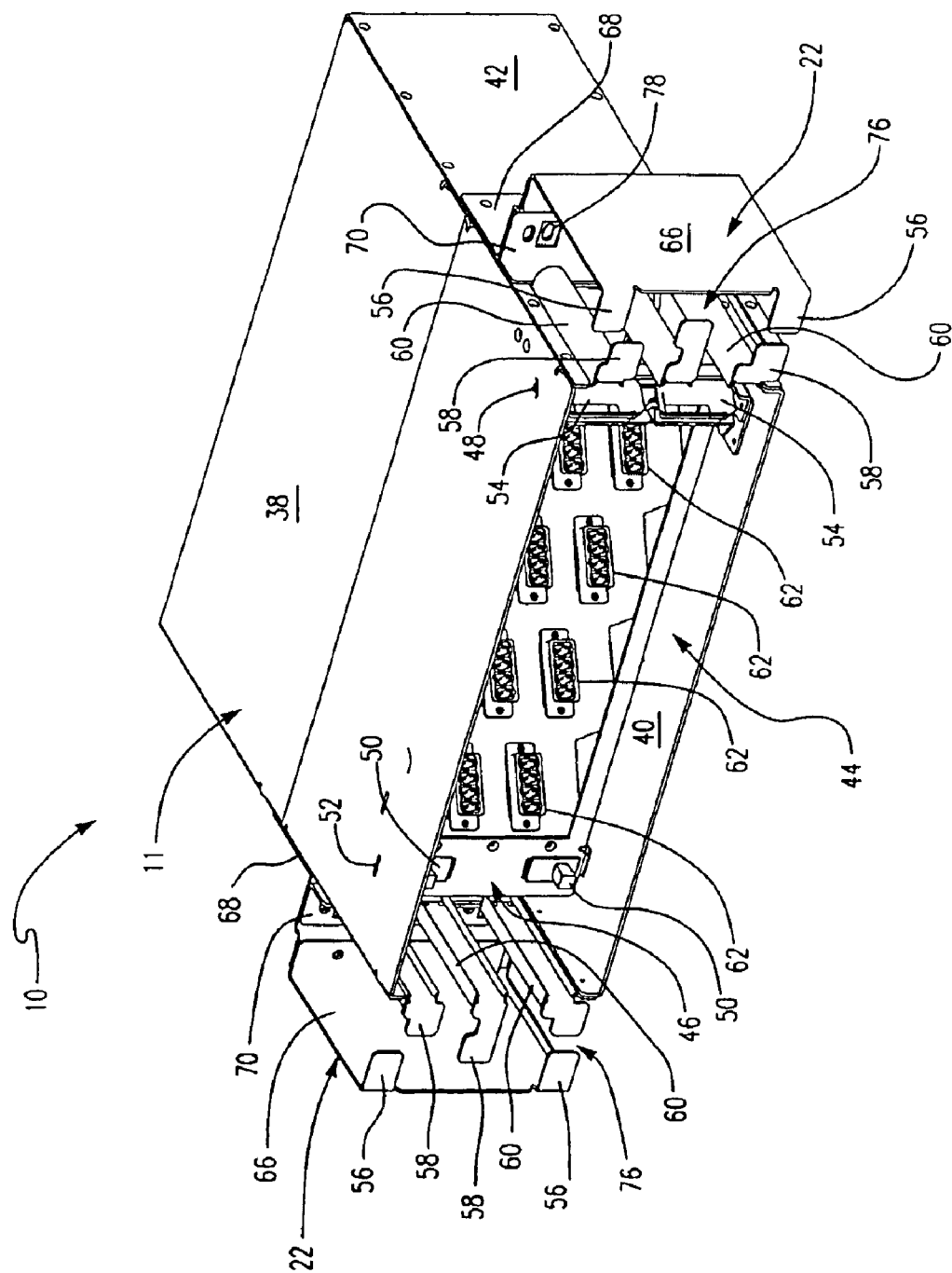
FIG. 10 is a first perspective view of a telecommunications cable connection module in accordance with the present invention.

Referring now to FIG. 10, module 10 includes a housing 11 including a top 38, a bottom 40 and first and second opposing sides 42. Housing 11 also includes an open end 44. Mounted within housing 11 adjacent open end 44 is connection bulkhead 46, to which is mounted a plurality of connection locations 62. As shown, each connection location 62 is capable of receiving and optically connecting up to four multi-fiber telecommunications fiber optic cables. Alternative connection locations are anticipated which are capable of receiving and optically connecting more or fewer cables which may include single or multiple strands of optical fiber, or which are capable of receiving and electrically connecting copper telecommunications cables.

Figure 12:
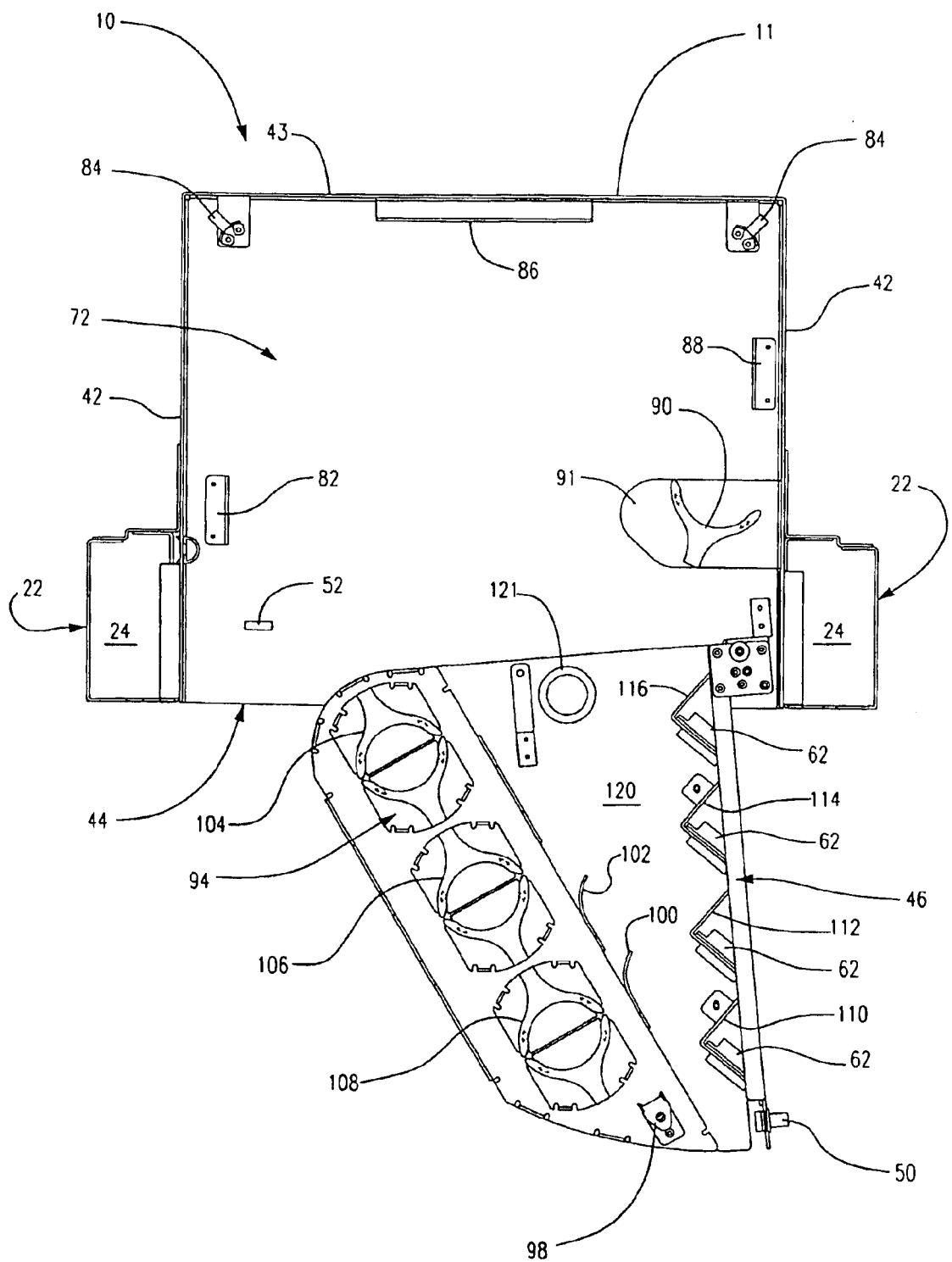
FIG. 12 is a top view of the module of FIG. 11, with the bulkhead within the module pivoted to an open position.

Bulkhead 46 is pivotably mounted within housing 11 and rotates around an axis 48 which extends between top 38 and bottom 42. Bulkhead 46 is releasably held in a closed position as shown in FIG. 10 where bulkhead 46 occludes at least a portion of opening 44 by one or more releasable latches or catches 50 which engage slots 52 in top 38 or bottom 40. By releasing catches 50, bulkhead 46 may be rotated to an open position as shown in FIG. 12, allowing access into an interior 72 of housing 11 as well as to both sides of connection locations 62 and to a cable management structure 94. Mounted to and movable with bulkhead 46, and located adjacent axis 48 is a pair of cable flares 54, which assist in the direction of cables from connection locations 62 into adjacent cable guide 22. Cable flares 54 also are curved to provide bend radius protection to cables passing through flares 54 and prevent kinking of the cables.

Cable guides 22 are mounted to opposing sides 42 near open end 44 and assist in the entry and exit of telecommunications cables to housing 11. Each cable guide 22 includes an outer shell 66, a mounting flange 68 and an inner shell 70. An opening 74 (shown in FIG. 13) in each side 42 permits cables to pass from interior 72 into cable guide 22. Outer shell 66 and inner shell 70 include fingers 56 and 58, respectively, which cooperate to form a staggered open front 76 to cable guide 22, permitting cables to be placed within the channel while keeping cables from unintentionally extending out of front opening 76. Inner shell 70 includes several arms 60, to which fingers 58 are mounted, which are curved to provide bend radius protection and avoid kinking of cables entering or exiting housing 11. Mounting flange 68, in addition to holding cable guide 22 together and mounting cable guide 22 to side 42, includes openings 78 which are adapted to allow module 10 to be mounted to mounting location 14 of rack 12.

Figure 3:
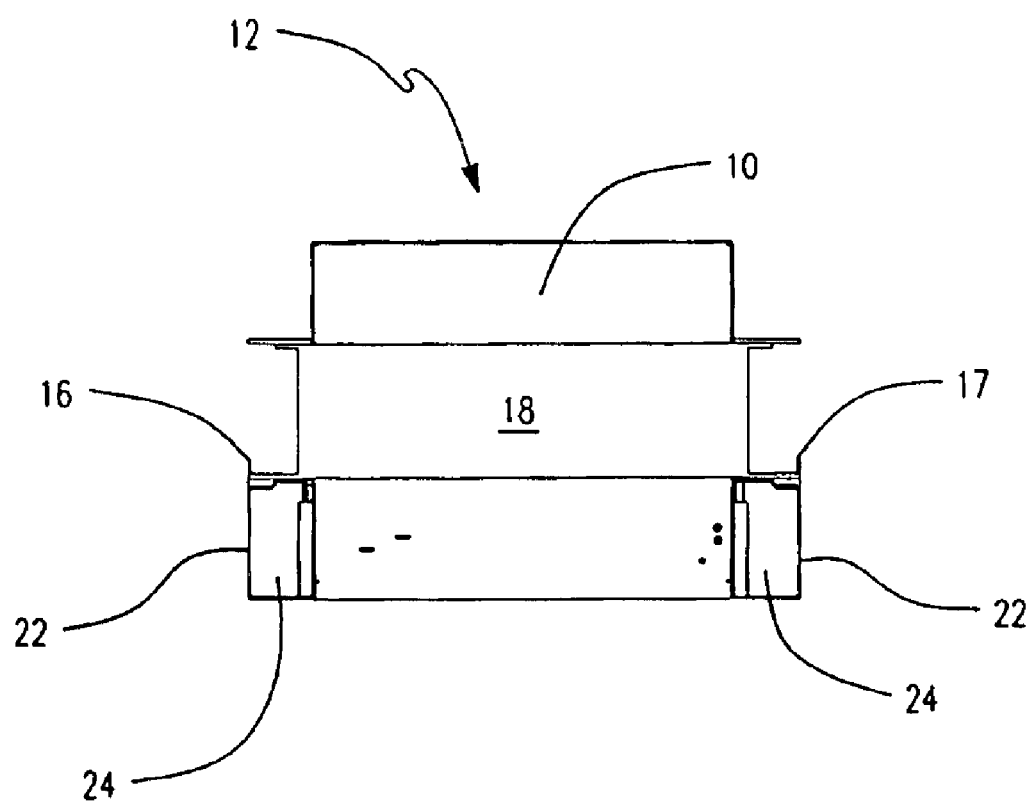
FIG. 3 is a top view of the equipment rack of FIG. 1.
Figure 4:
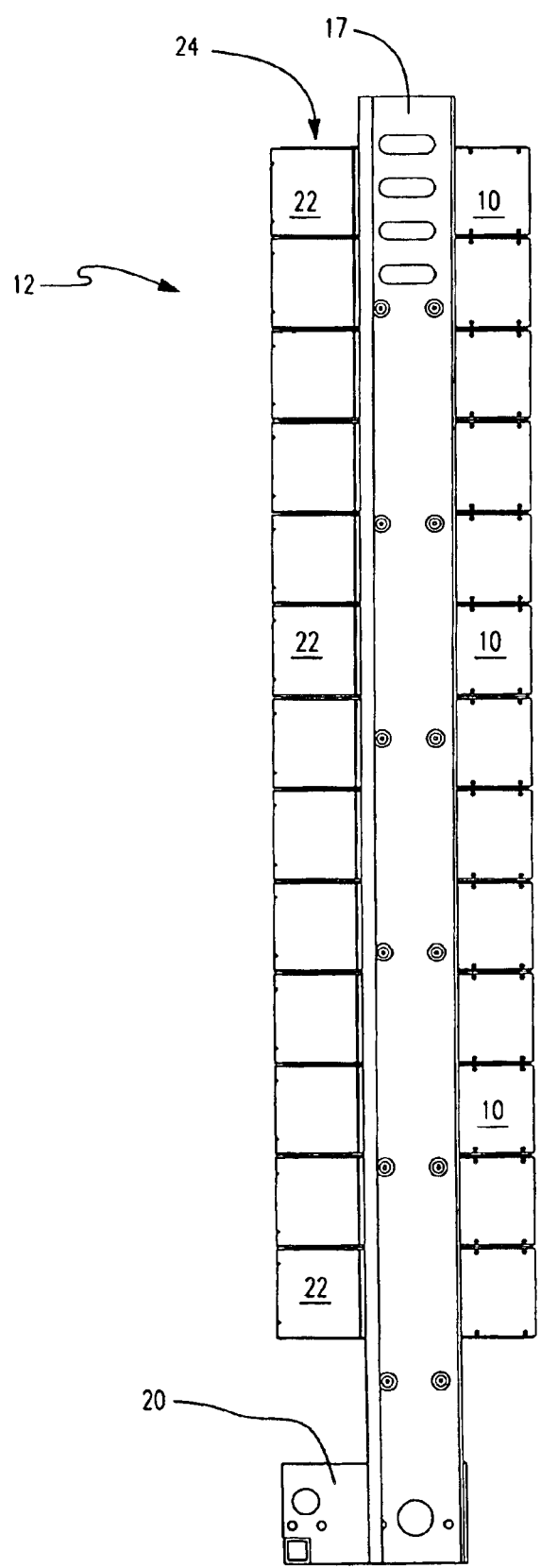
FIG. 4 is a side view of the equipment rack of FIG. 1.
Figure 5:
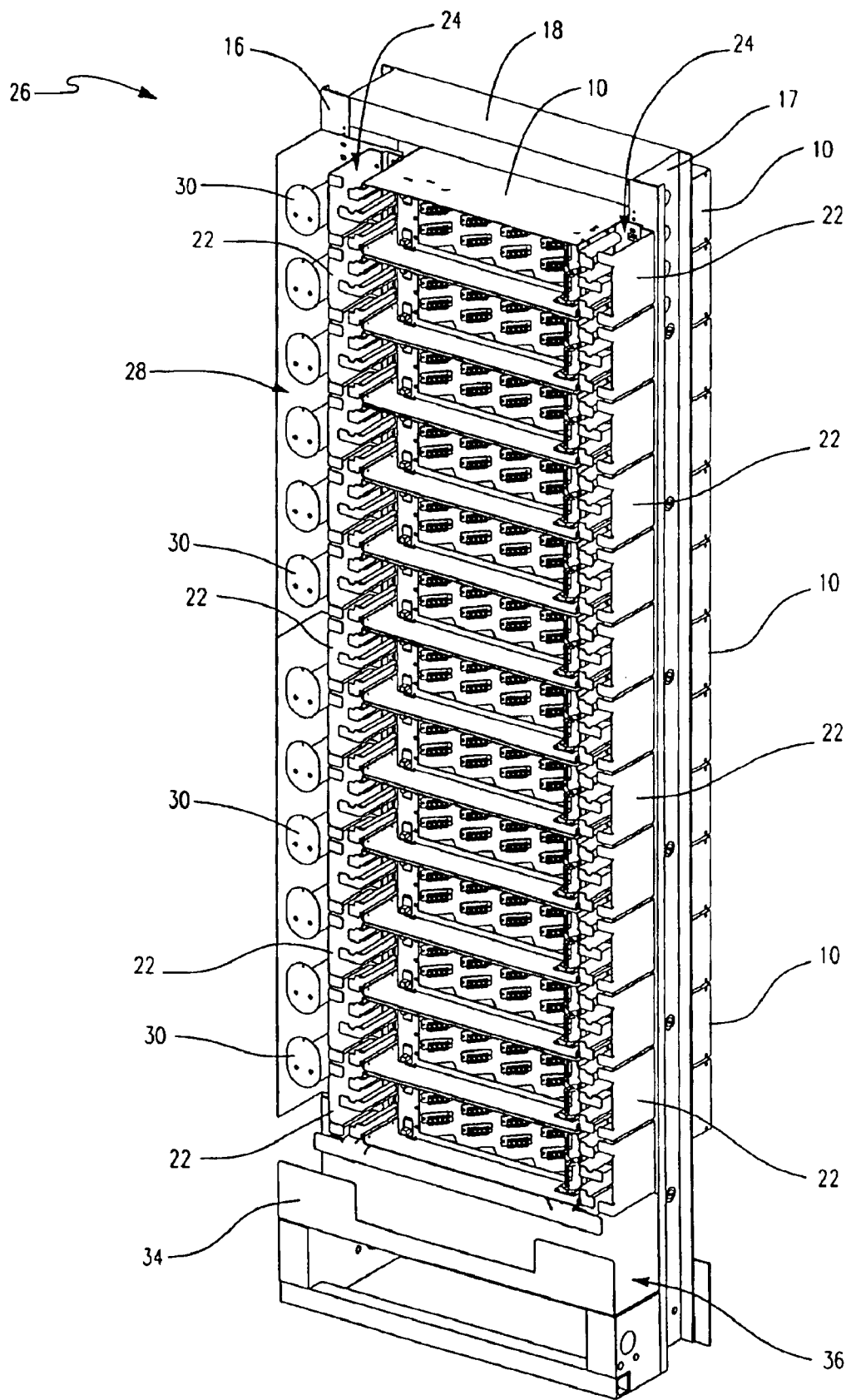
FIG. 5 is a perspective view of a second embodiment of a telecommunications equipment rack in accordance with the present invention.
Figure 6:
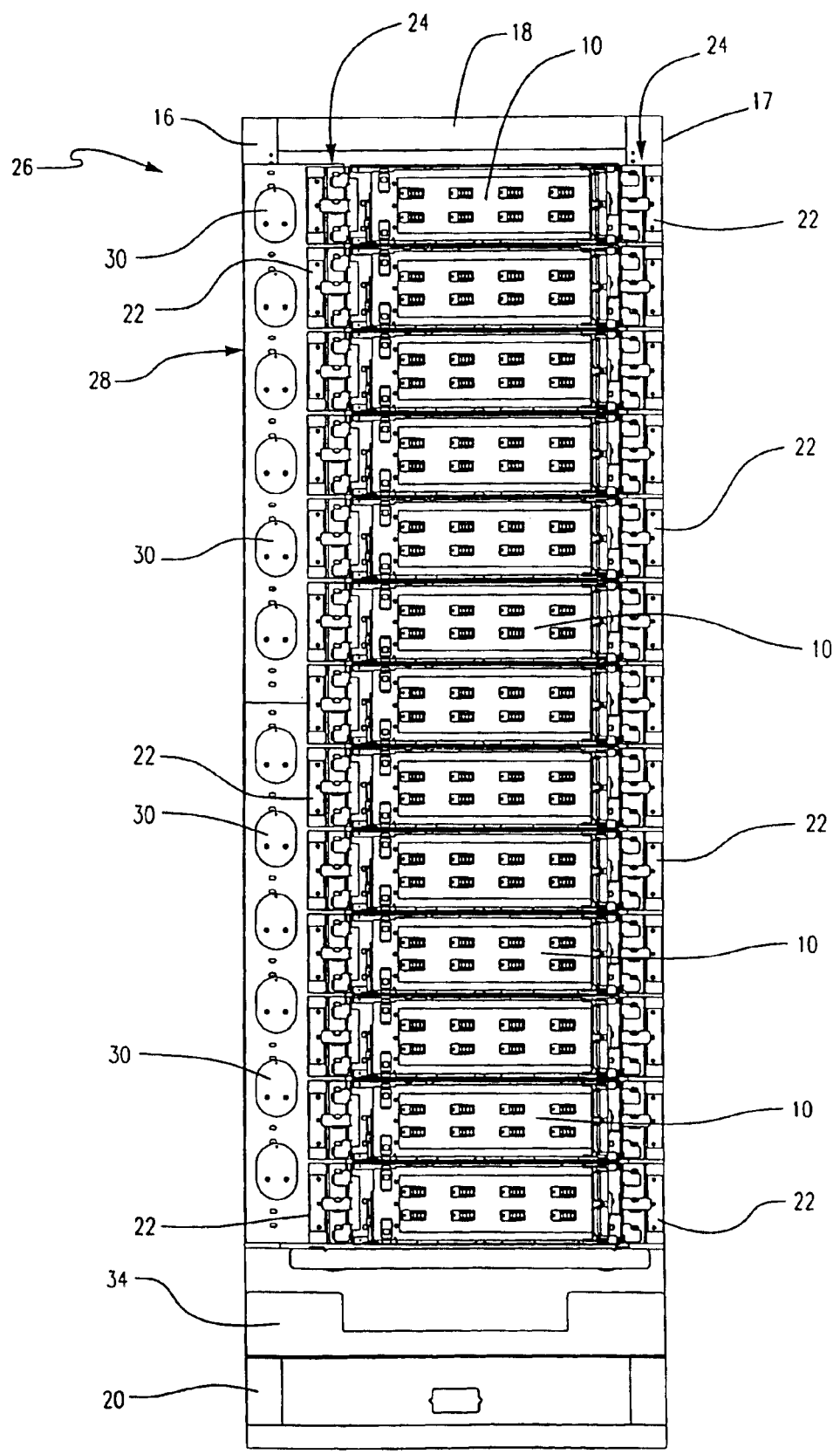
FIG. 6 is a front view of the equipment rack of FIG. 5.
Figure 7:
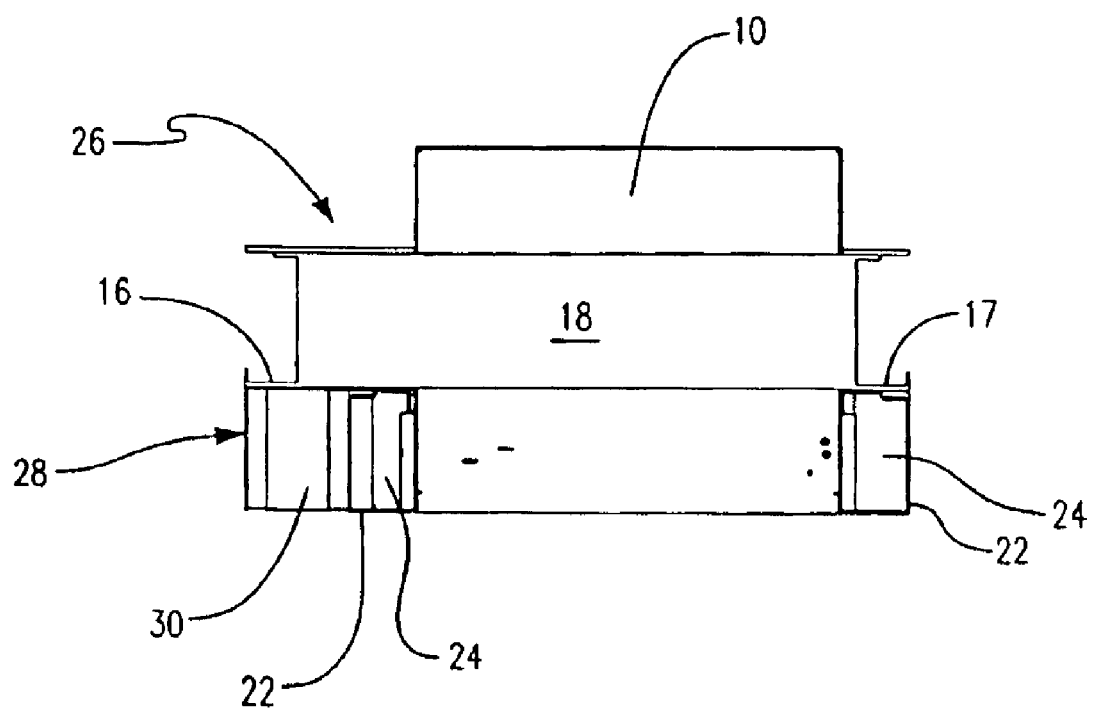
FIG. 7 is a top view of the equipment rack of FIG. 5.
Figure 8:
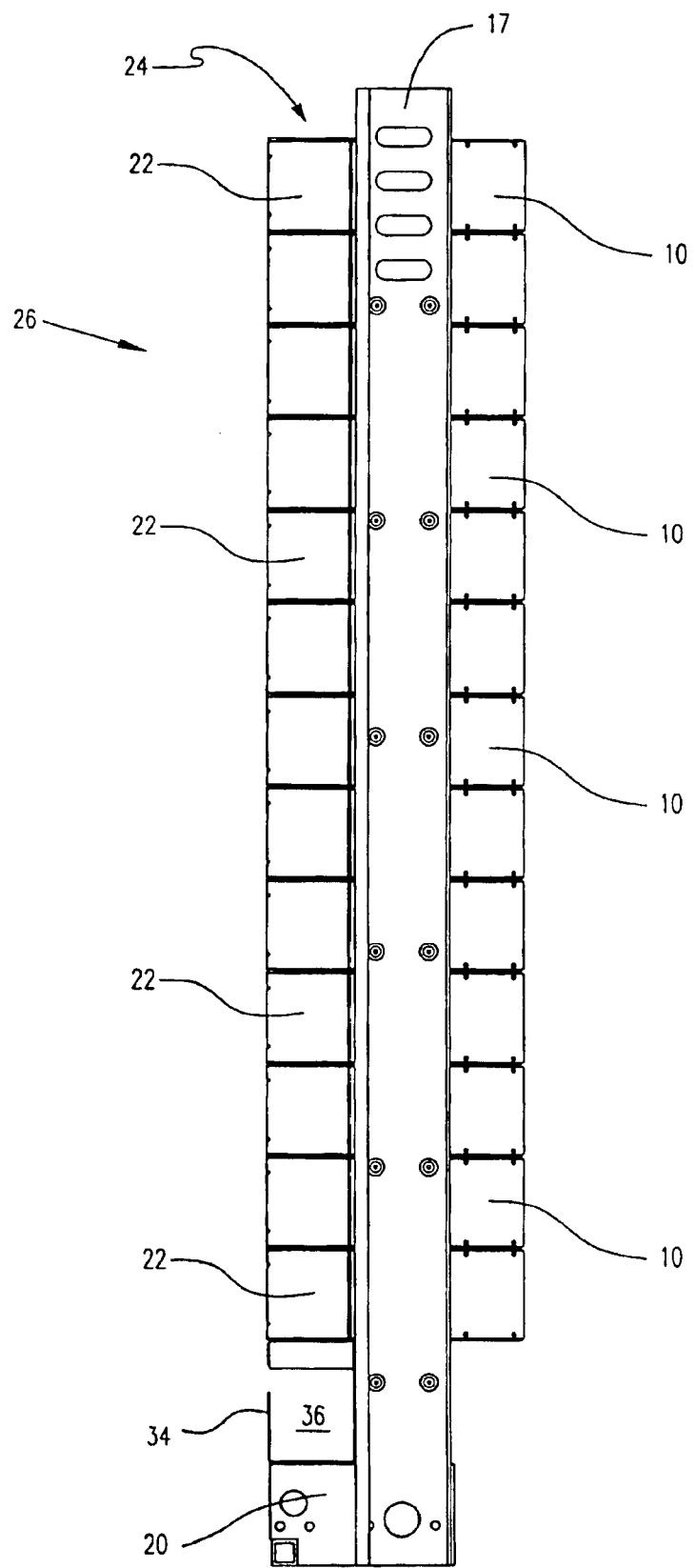
FIG. 8 is a side view of the equipment rack of FIG. 5.
Figure 9:
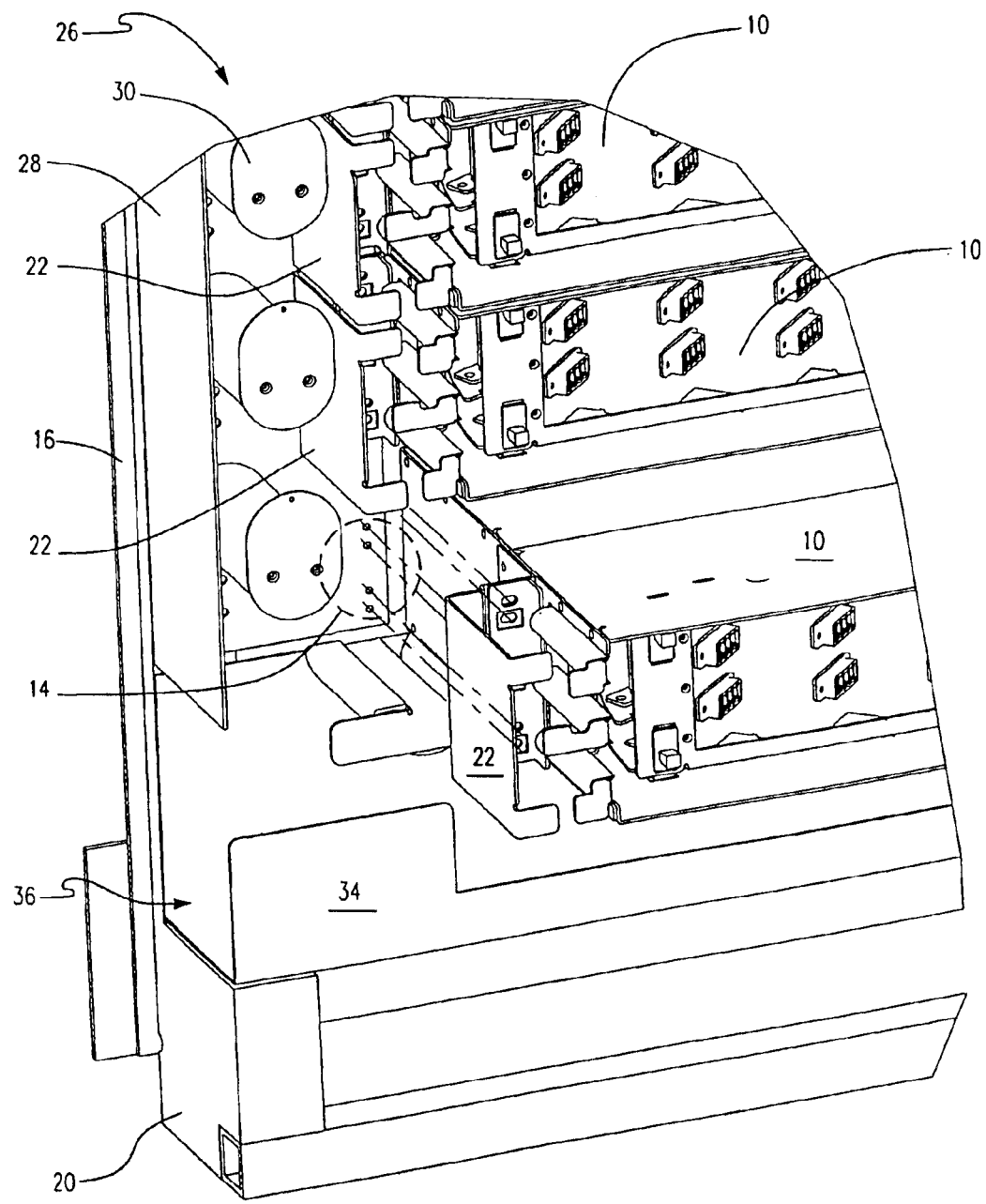
FIG. 9 is a close up view of a portion of the equipment rack of FIG. 5, showing a mounting location for a telecommunications cable connection module.
Figure 11:
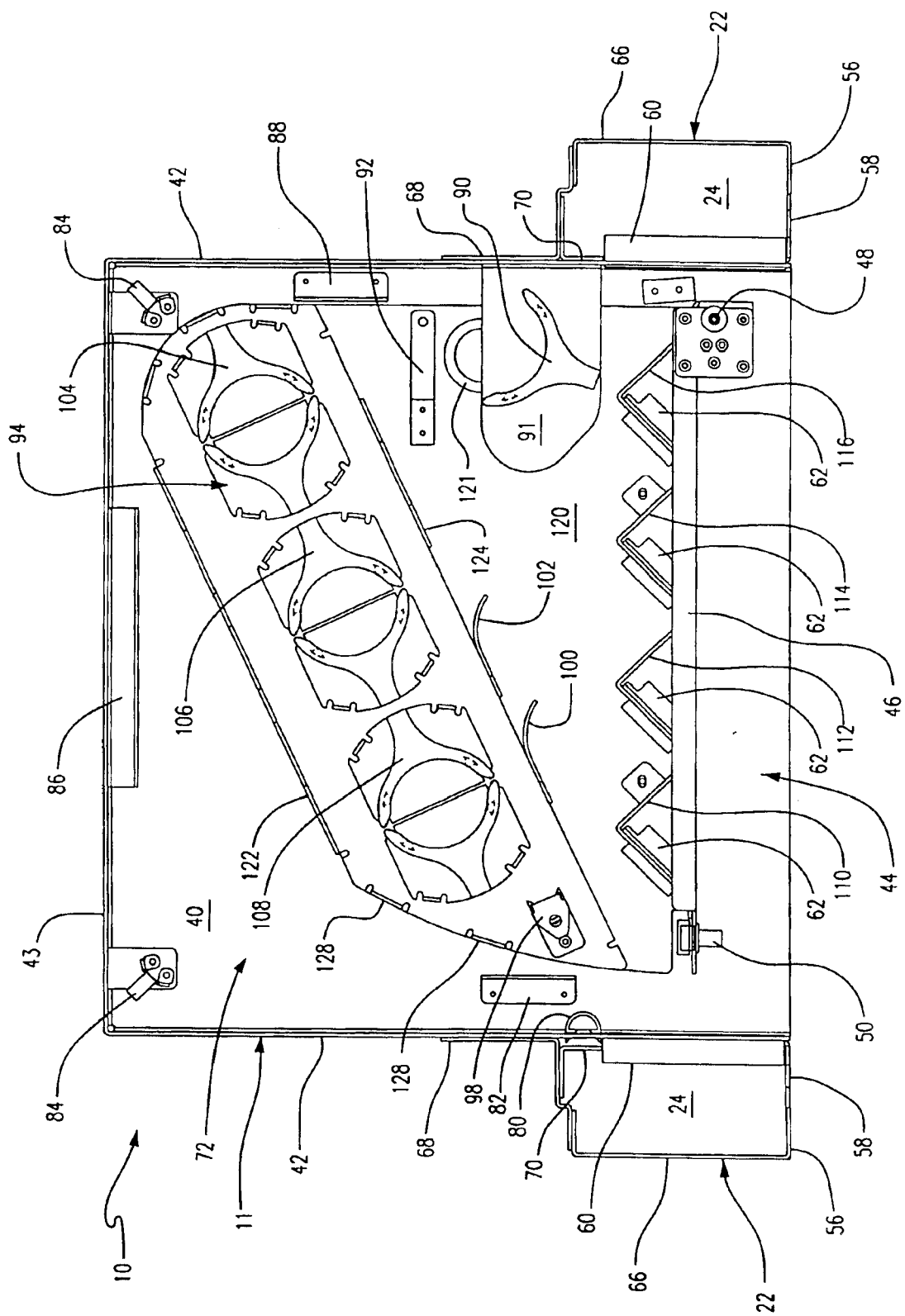
FIG. 11 is a top view of the module of FIG. 10 with the top removed to show the arrangement of a connection bulkhead within the module.

Referring now to FIGS. 11 and 12, module 10 is shown with top 38 removed so that interior 72 is revealed in more detail. An example routing path for a cable entering interior 72 from cable guide 22 might be as follows: from vertical channel 24 (as shown in FIG. 3), the cable would pass between arms 60 and into interior 72, pass between a transition guard 80 and a cable shield 82, extend along side 42 to a corner guard 84, turning around guard 84 to extend along a rear wall 43 through a cable shield 86 to a second corner guard 84, turning about second guard 84 to extend along side 42 through a cable shield 88, around a half spool 90 and through a cable ring 92, entering cable management structure 94 at a spool 104. To extend from cable management structure 94 to connection location 62 mounted to an angled bracket 110, the cable would extend from an outer spool 108 about an outer guard 98. To extend from cable management structure 94 to connection location 62 mounted to an angled bracket 112, the cable would extend directly from spool 108. To extend from cable management structure 94 to connection location 62 mounted to an angled bracket 114, the cable would extend from spool 108 about an intermediate guard 100. To extend from cable management structure 94 to connection location 62 mounted to an angled bracket 116, the cable would extend from spool 108 about an inner guard 102.

Figure 20:
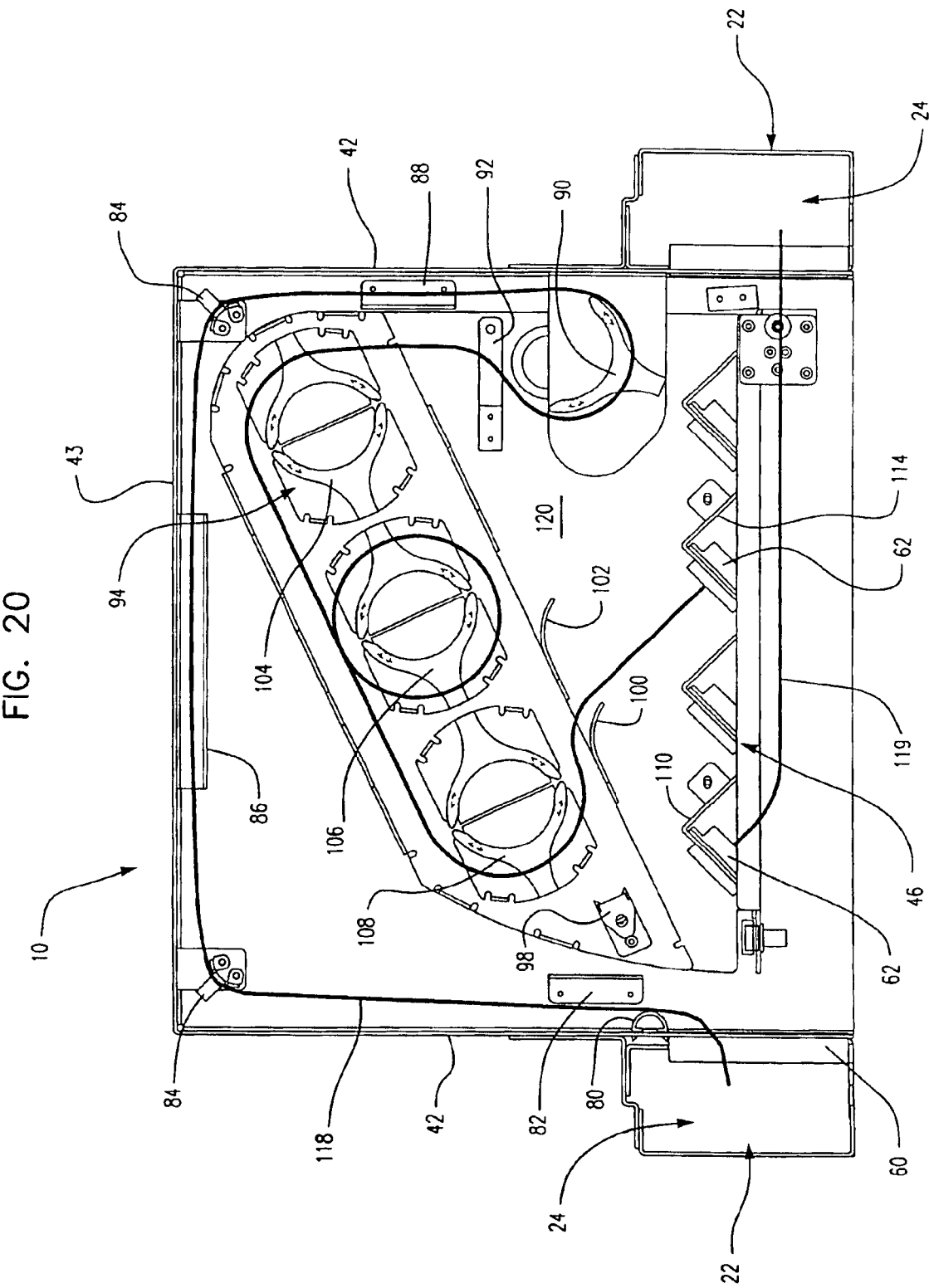
FIG. 20 is a top view of the connection module of FIG. 11, showing the routing of a telecommunications cable within the connection module with the connection bulkhead in a first position.
Figure 21:
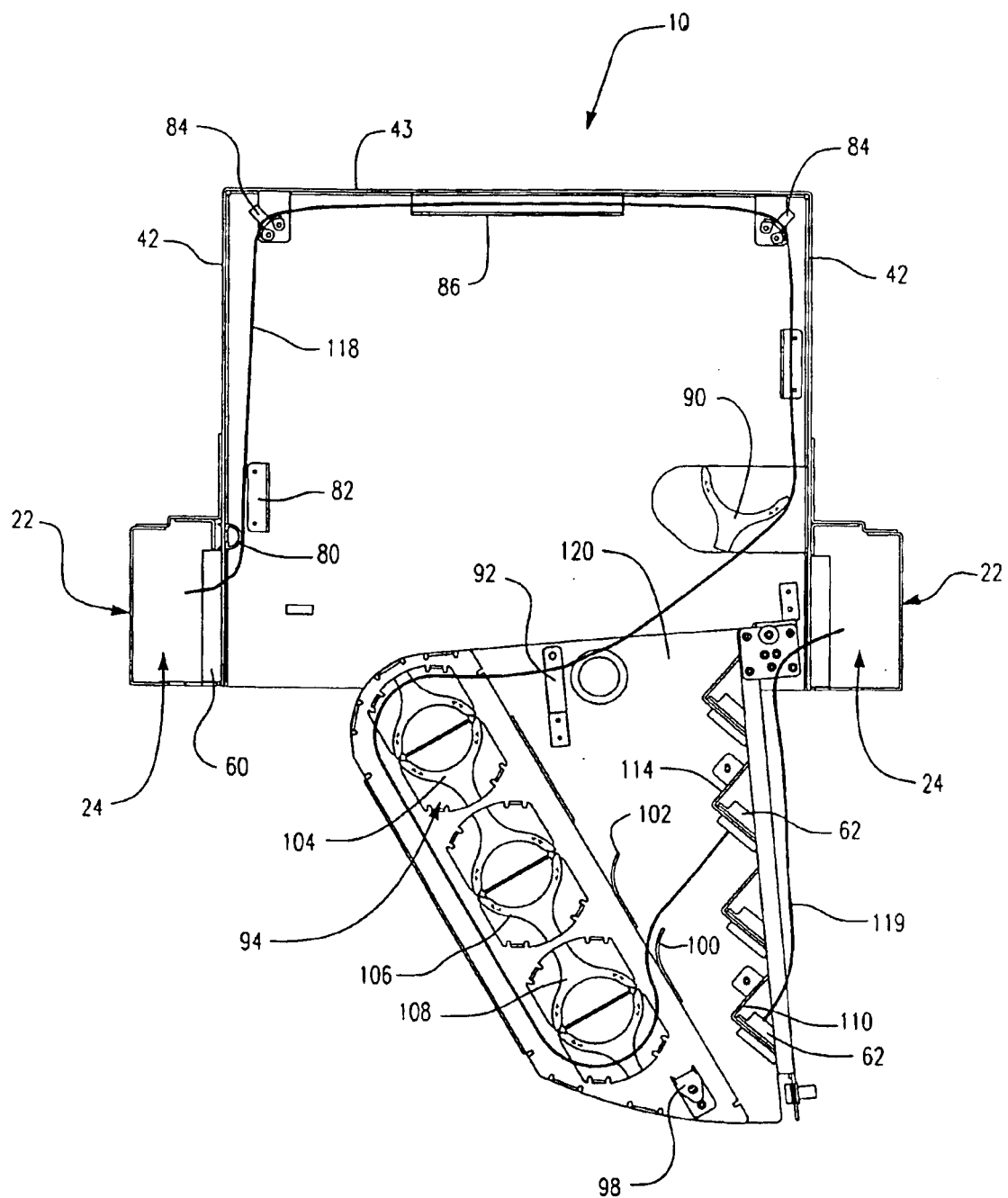
FIG. 21 is a top view of the connection module of FIG. 12, showing the routing of a telecommunications cable within the connection module with the connection bulkhead in a second position.

As shown in FIGS. 11 and 12, spools 104, 106 and 108 provide a plurality of cable paths of varying lengths. For example, as shown in FIGS. 20 and 21, a cable 118 enters interior 72 through arms 60 from a first vertical cable channel 24 defined by cable guide 22, is routed along sides 42 and rear wall 43 to half spool 90 and ring structure 92 to cable management structure 94. Cable 118 is then passed partially around spool 104, wrapped once fully around spool 106 to store excess slack before being passed partially around spool 108, around intermediate guard 100 and directed to connection location 62 on angled bracket 114.

Alternatively, if cable 118 were not as long as shown in FIGS. 20 and 21, it might not have been necessary to pass cable 118 entirely around spool 106. Further, if cable 118 were longer than shown in FIGS. 20 and 21, it might been necessary to pass cable 118 two or more times around spool 106 or spool 104 or spool 108 or around some combination of the three spools, before directing cable 118 to connection location 62.

The angles of brackets 110, 112, 114 and 116 allows cable 118 to be extended from cable management structure 94 to a connection location 62 with a minimal number of bends. Similarly, the angles of brackets 110, 112, 114 and 116 aid in the direction of cable 119 from connection location 62 through arms 60 into a second vertical cable channel 24 defined by cable guide 22. Brackets 110, 112, 114 and 116 are staggered so that all of the connection locations are placed at an angle to bulkhead 46 but lie roughly in a line defined bulkhead 46.

Positioning half spool 90 adjacent axis 48 allows bulkhead 46 to pivot from a closed position to an open position with excessively tensioning cable 118 or having excessive slack within interior 72. Ring structure 92 is positioned to provide a consistent entry of cable 118 to cable management structure 94 from half spool 90 as bulkhead 46 is swung from an open to a closed position, and vice versa. The various cable routing structures within interior 72 cooperate to direct cable 118 to bulkhead 46 without interfering with the movement of bulkhead 46 and also ensure that bend radius rules for cable 118 are maintained as cable 118 goes through multiple direction changes. Cable 119 extends from connection location 62 on bulkhead 46 through cable flare 54 and between arms 60 to pass into a second cable channel 24 defined by cable guide 22. From this point, cable 119 may be directed to another piece of telecommunications equipment.

Figure 13:
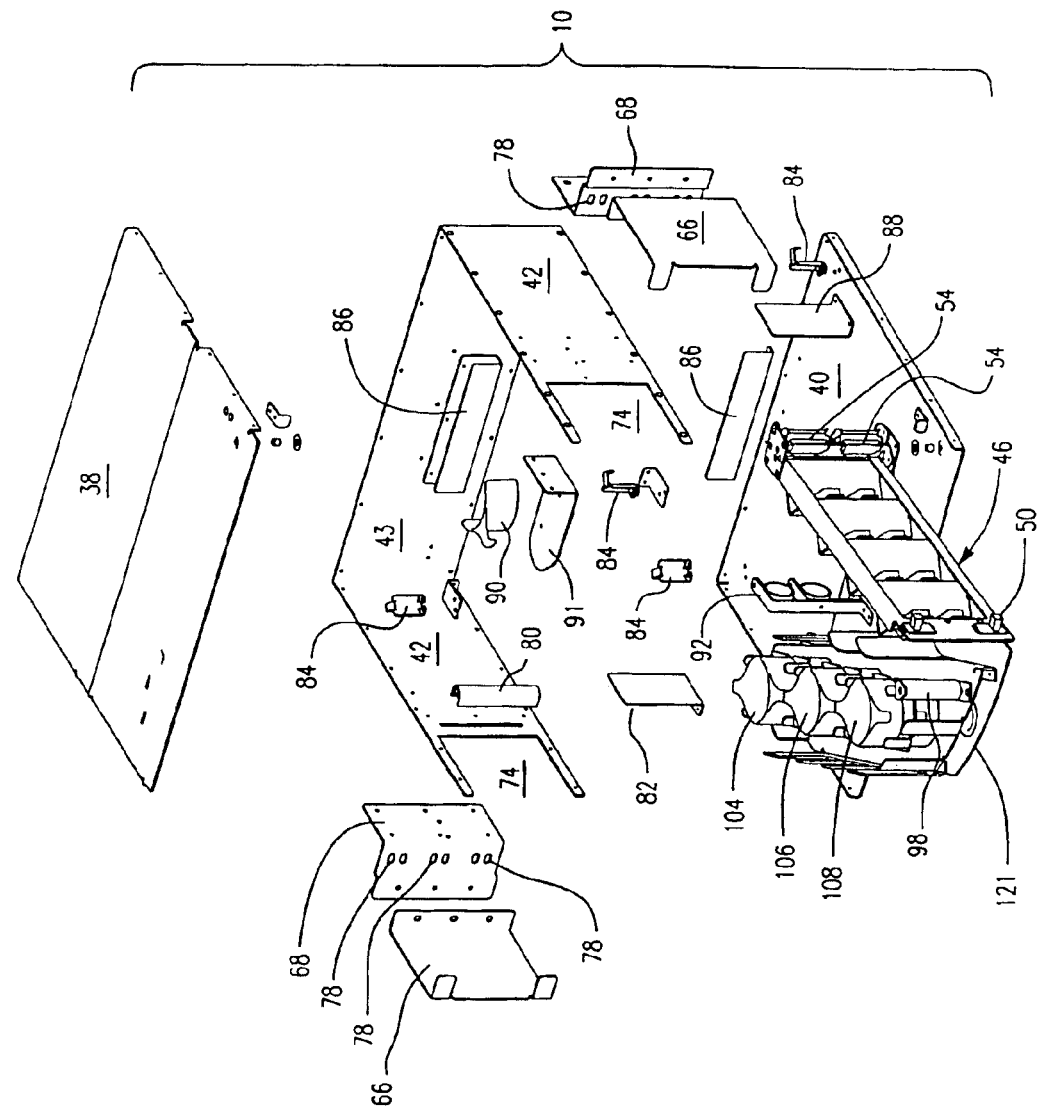
FIG. 13 is an exploded perspective view of the module of FIG. 10 with elements removed for clarity.
Figure 14:
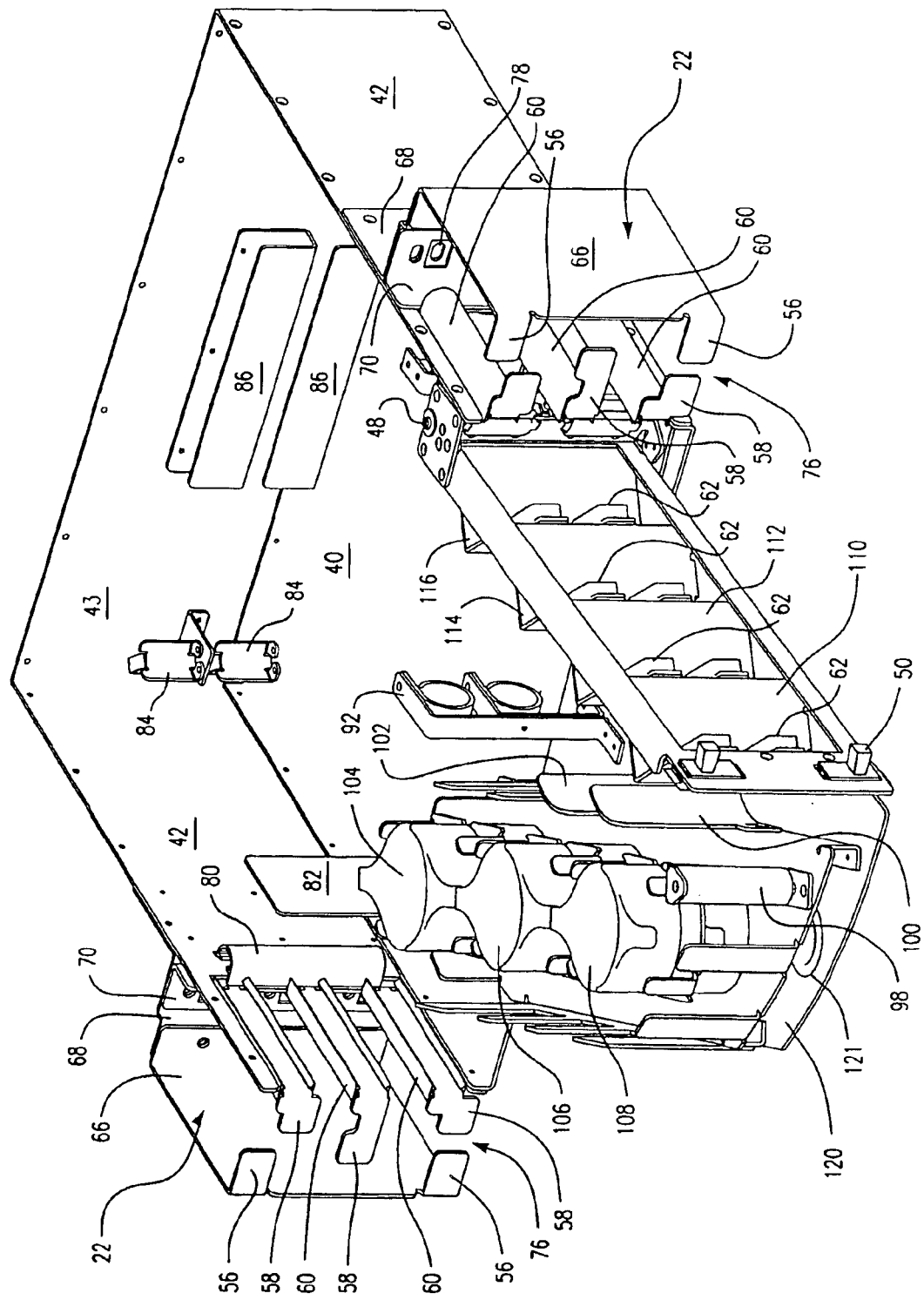
FIG. 14 is a first perspective view of the module of FIG. 12.
Figure 15:
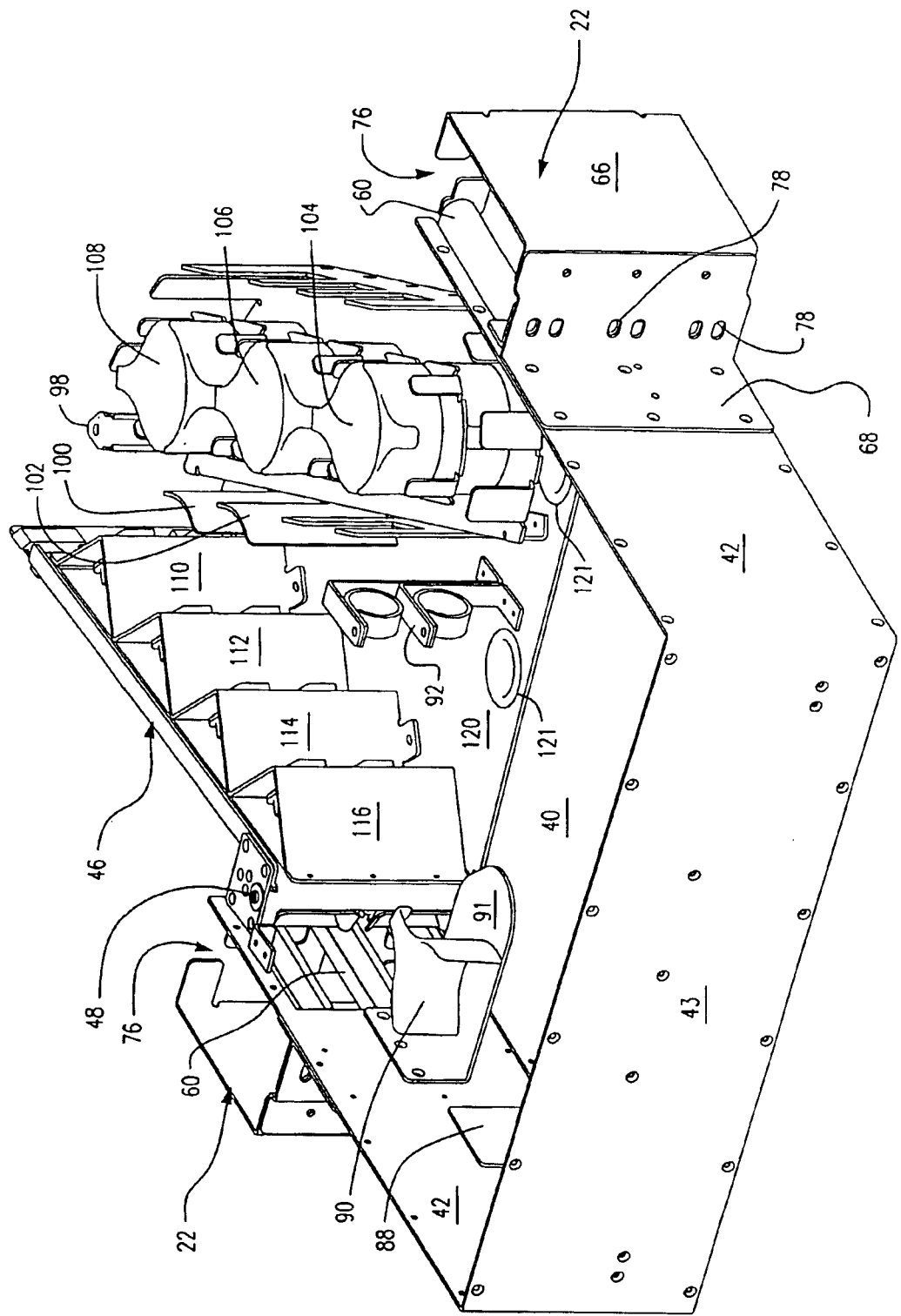
FIG. 15 is a second perspective view of the module of FIG. 12.

Referring now to FIGS. 13 through 15, the routing devices along sides 42 and rear wall 43 include two vertically spaced apart sets of routing devices, defining an upper cable path and a lower cable path for routing a cable 118 about interior 72 to bulkhead 46. Also shown in these FIGS., and in FIGS. 16 and 17, below, ring structure 92 and spools 104, 106 and 108 include two cable tiers for receiving cables from the corresponding upper or lower cable path and directing cable 118 to an upper or lower connection location 62, respectively.

Figure 16:
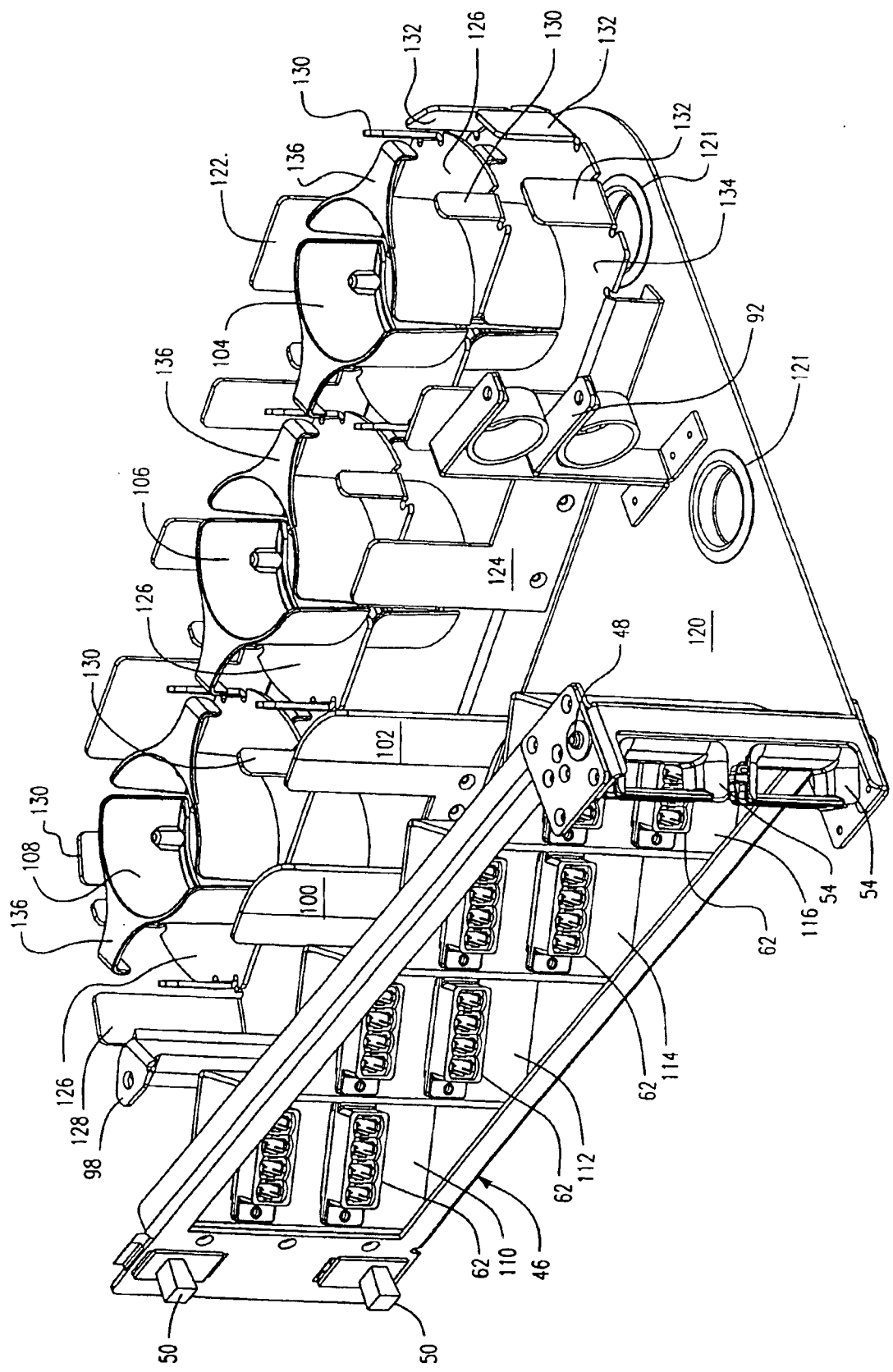
FIG. 16 is a first perspective view of the connection bulkhead of the connection module of FIG. 11.
Figure 17:
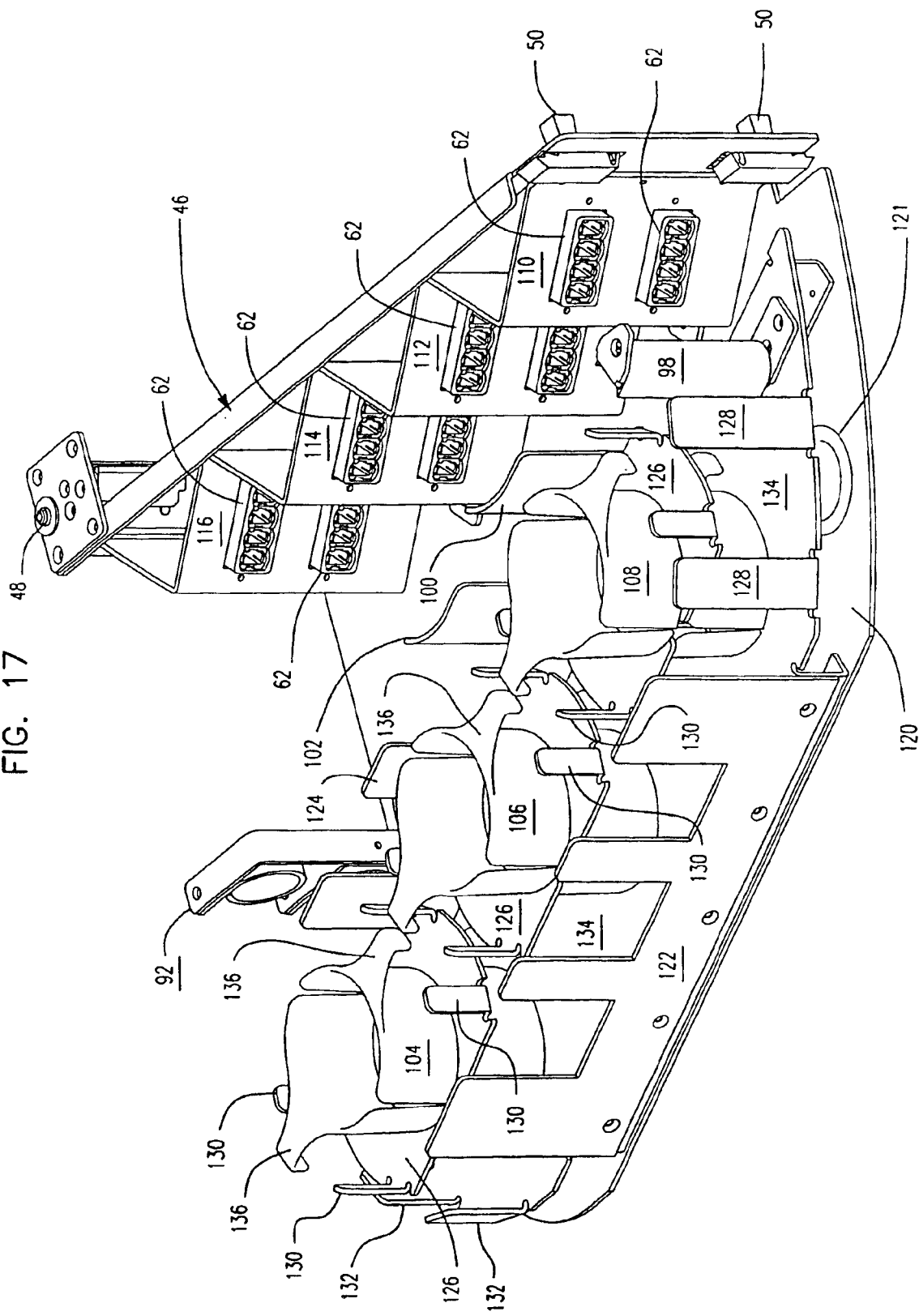
FIG. 17 is a second perspective view of the connection bulkhead of FIG. 16.

Referring now to FIGS. 16 and 17, additional detail of bulkhead 46 is provided. Cable management structure 94 is mounted to a flange 120 extending from rearward from bulkhead 46. Ring structure 92 is also mounted to flange 120, while half spool 90 is mounted to side 42 of housing 11. At the rear edge of flange 120 and extending across both upper and lower tiers of spools 104, 106 and 108 is a cable guard 122, which serves to contain any undue slack in cable 118 and prevent it from interfering with the movement of bulkhead 46. Located on the opposite side of spools 104 and 106 from cable guard 122 is an inner cable guard 124, which also helps contain any excessive slack from cable 118 passing through cable management structure 94. Several pads 121 are located on flange 120 through circular openings in flange 120. Pads 121 rest on bottom 40 and are made of a low friction material so that pads 121 glide along bottom 40 when bulkhead 46 is pivoted. Pads 121 service to provide support to bulkhead 46 and reduce binding about axis 48 so that bulkhead 46 may be pivoted open or closed.

For each spool 104, 106 and 108, an intermediate flange 126 cooperates with a pair of upper tabs 136 to define the upper cable path. Extending upward from intermediate flanges 126 are extensions 130 to aid in controlling cable 118 when cable 118 is routed within the upper cable path while still allowing access to cable 118. For each spool 104, 106 and 108, intermediate flange 126 cooperates with a raised floor 134 to define the lower cable path. Extending upward from floor 134 are extensions 128 and 132, which cooperate with cable guard 122 to control cable 118 within the lower cable path and prevent undue slack from interfering with the movement of bulkhead 46, while still allowing access to the lower cable path for inserting or removing cables 118.

Figure 18:
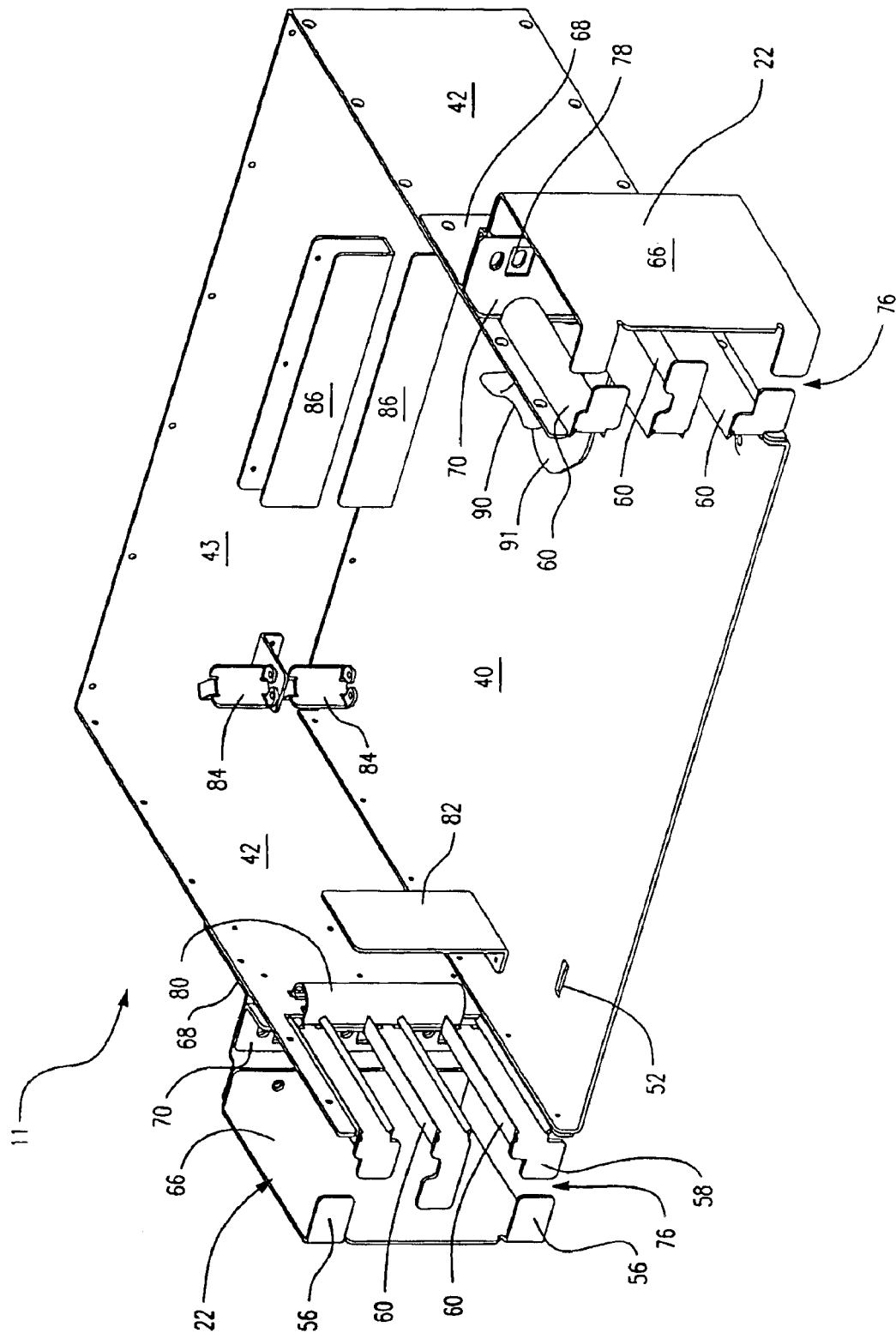
FIG. 18 is a first perspective view of the housing of the connection module of FIG. 12, with the top removed.
Figure 19:
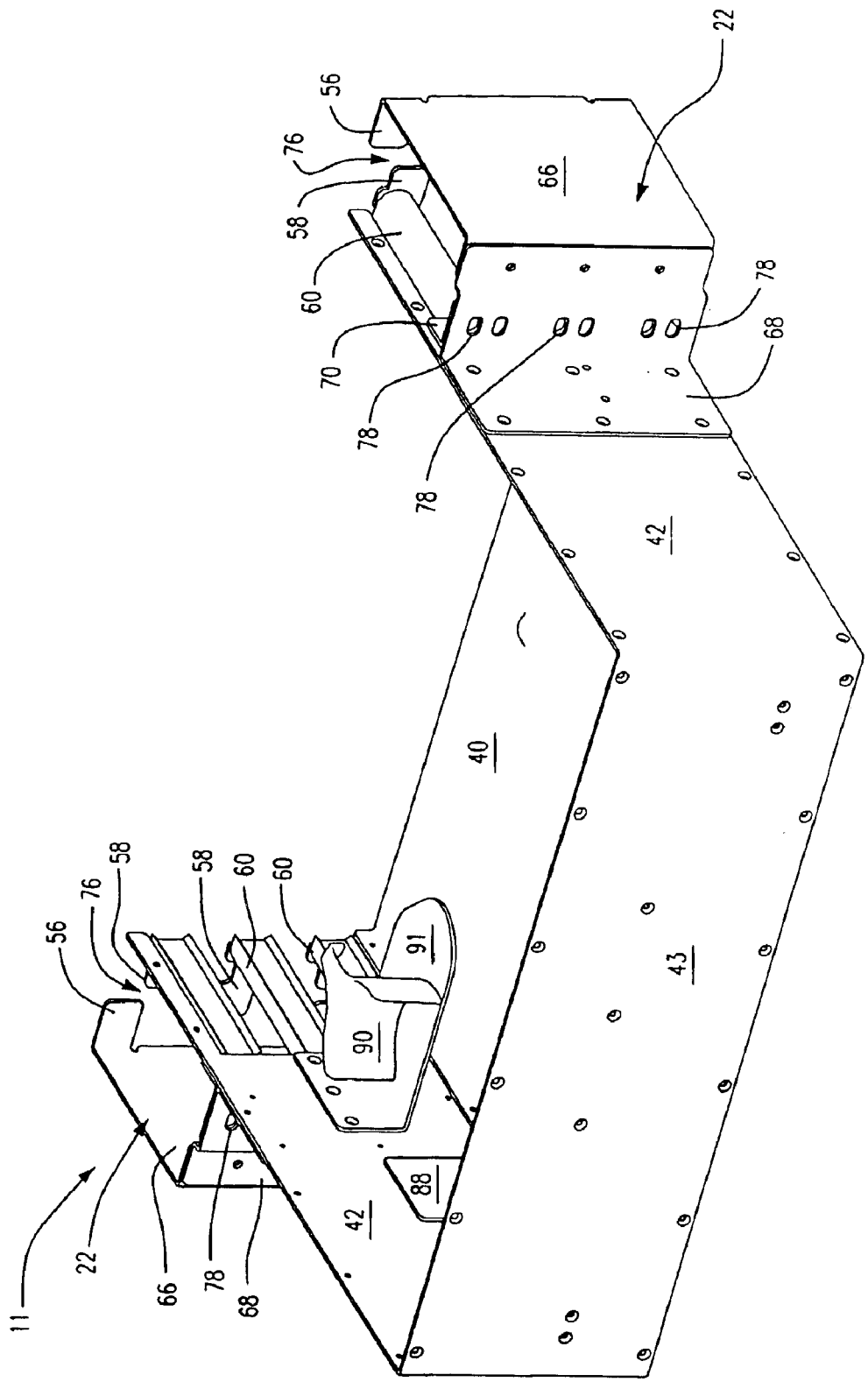
FIG. 19 is a second perspective view of the housing of FIG. 18.

Referring now to FIGS. 18 and 19, the components for routing cable 118 from arm 60 to half spool 90 are shown with bulkhead 46 removed. In these FIGS. the upper and lower cable paths for routing cable 118 around interior 72 are evident. Mounting openings 78 of cable guide 22 are also shown for mounting module 10 to rack 12 at mounting locations 14, as shown in FIGS. 1 through 9, above. Half spool 90 is shown mounted to a plate 91 extending from side 42 above bottom 40 so that flange 120 may be positioned underneath and overlapping half spool 90 when bulkhead 46 is in a closed position.

It is understood that module 10 as described above and shown in the FIGS. with bulkhead 46 pivoting about axis 48 positioned adjacent right side 42 may also be adapted as a mirror image module 210 with an axis 248 located adjacent left side 42. All other components within interior 72 including bulkhead 246 would be similarly adapted and positioned in mirror image locations within module 210.

It is also anticipated that a single cable path about interior 72 and within cable management structure 94 maybe used in place of the upper and lower cable paths illustrated, or that more than two cable paths may be provided. As illustrated, connection locations 62 are adapted to receive and optically connect ribbon or MTP multi-strand optical fiber cables 118. The orientation of spools 104, 106 and 108 on flange 120 aids in placing MTP cables 118 within module 10 so that cable 118 is not twisted. Reduction of twist when loading MTP cables within module is desirable to maintain bend radius constraints for maximum data transfer efficiency. Connection locations 62 may also be adapted to receive and optically connect other multi-strand optical fiber cable styles, or may be adapted to receive and optically connect single strand optical fiber cables.

Module 10 as illustrated is an optical fiber termination and connection module as shown and described above but may be adapted for use with copper telecommunications cables and connection locations as well. At higher levels of transfer speed, copper telecommunications cables also require bend radius protection to maintain data throughput.

With regard to the foregoing description, it is to be understood that changes may be made in detail, especially in matters of the construction materials employed and the shape, size and arrangement of parts without changing the scope of the present invention. It is intended that the specification and the depicted aspects be considered exemplary only, with the true scope and spirit of the invention being indicated by the broad meaning of the following claims.

What is claimed is as follows:

1. A module for connecting telecommunications cables comprising:
    a housing including a top, a bottom, a first side and a second opposing side, defining an interior, an exterior and a front opening into the interior;
    a bulkhead pivotably mounted within the opening, pivoting about a vertical axis located adjacent the second side, and movable between a first position occluding the front opening and a second position allowing access through the front opening into the interior, the bulkhead having a first side which is oriented toward the interior when the bulkhead is in the first position and an opposing second side;
    the bulkhead including a plurality of connection locations for connecting a first telecommunications cable on the first side of the bulkhead with a second telecommunications cable on the second side of the bulkhead;

the bulkhead including a cable management structure which moves with the bulkhead, the cable management structure providing slack storage for a plurality of cable slack lengths and further including cable guide structures to provide bend radius protection and direct a telecommunications cable to the cable management structure from the interior of the housing and from the cable management structure to the connection locations on the first side of the bulkhead.

2. The module of claim 1, wherein the connection locations are adapted to receive and optically connect first and second telecommunications cables which ale optical fiber cables.

3. The module of claim 2, wherein each of the first and second telecommunications cables contain a plurality of optical fibers and the connection locations allow each optical fiber within the first cable to be optically connected to an optical fiber within the second cable.

4. The module of claim 1, wherein the interior includes a cable routing path to direct telecommunications cables entering the interior from a first vertical cable guide mounted to the fi side along the exterior of the housing through an opening in the first side to the cable guide structure directing the cables to the cable management structure.

5. The module of claim 4, wherein a second vertical cable guide is mounted to the second side along the exterior of the housing and the second side of the housing is adapted to allow cables extending from the second side of the bulkhead to enter the second vertical cable guide.

6. The module of claim 5, wherein the bulkhead angles the connection locations so that cables extending from the second side of the bulkhead are directed toward the opening in the second side of the housing.

7. The module of claim 1, wherein the cable management structure includes a plurality of slack storage spools.

8. The module of claim 7, wherein the slack storage spools are oriented about a generally vertical axis.

9. The module of claim 7, wherein the bulkhead includes a flange extending into the interior of the housing when the bulkhead is in the first position and the slack storage spools and the cable guide structure leading cables from the slack storage spools to the connection locations arc mounted to the flange.

10. The module of claim 7, wherein the slack storage spools include a plurality of vertically spaced apart levels for receiving telecommunications cable from the cable guide structure directing cables from the cable routing path along the interior of the housing.

11. The module of claim 4, wherein the first vertical cable guide is mounted to the first side proximate the front opening of the housing.

12. The module of claim 5, wherein the second vertical cable guide is mounted to the second side proximate the front opening of the housing.

13. The module of claim 5, wherein the first and second vertical cable guides include openings for receiving fasteners for mounting the housing to a telecommunications equipment rack.

14. A telecommunications connection system comprising:
a connection module including:
a housing an interior with a front opening and an exterior,
a bulkhead with a first side and an opposing second side pivotably mounted in the interior, movable about a vertical axis from a first position occluding the opening and a second position allowing access to the interior of the housing, the first side of the bulkhead oriented toward the interior when the bulkhead is in the first position, the bulkhead including connection locations for connecting a first telecommunications cable on the first side of the bulkhead with a second telecommunications cable on the second side of the bulkhead;
the bulkhead including a cable management structure adjacent the second side which moves with the bulkhead, the cable management structure providing slack storage for a plurality of cable slack lengths and further including cable guide structures to provide bend radius protection and direct a telecommunications cable to the cable management structure from the interior of the housing and from the cable management structure to the connection locations on the first side of the bulkhead;
a first vertical cable guide mounted adjacent the exterior of the housing on a first side, and a second vertical cable guide mounted adjacent the exterior of the housing on a second side, the first and second sides including cable access openings allowing cables to extend from the interior of the housing into the first and second vertical cable guides respectively;
a telecommunications equipment rack including a first vertical support and a second vertical support spaced apart from one another, the first and second vertical supports cooperating to define a plurality of mounting locations for receiving the connection module;
the connection module mounted to one of the mounting locations of the equipment rack.

15. The telecommunications connection system of claim 14, wherein the connection module is a first connection module and a plurality of additional connection modules are mounted to the mounting locations, the first vertical cable guide of each connection module cooperating to define a first vertical cable channel and the second vertical cable guide of each connection module cooperating to define a second vertical cable channel.

16. The telecommunications connection system of claim 14, wherein the connection locations are adapted to receive and optically connect a first telecommunications cable and a second telecommunications cable, the first and second cables being optical fiber cables.

17. The telecommunications connection system of claim 16, wherein each of the first and second cables contain a plurality of optical fibers and the connection locations allow each optical fiber within the first cable to be optically connected to an optical fiber within the second cable.

18. A telecommunications connection system comprising:
a connection module including:
a housing an interior with a front opening and an exterior:
a bulkhead with a first side and an opposing second side pivotably mounted in the interior, movable about a vertical axis from a first position occluding the opening and a second position allowing access to the interior of the housing, the first side of the bulkhead oriented toward the interior when the bulkhead is in the first position, the bulkhead including connection locations for connecting a first telecommunications cable on the first side of the bulkhead with a second telecommunications cable on the second side of the bulkhead;

the bulkhead including a cable management structure adjacent the second side which moves with the bulkhead, the cable management structure providing slack storage for a plurality of cable slack lengths and further including cable guide structures to provide bend radius protection and direct a telecommunications cable to the cable management structure from the interior of the housing and from the cable management structure to the connection locations on the first side of the bulkhead; p2 a first vertical cable guide mounted adjacent the exterior of the housing on a first side, and a second vertical cable guide mounted adjacent the exterior of the housing on a second side, the first and second sides including cable access openings allowing cables to extend from the interior of the housing into the first and second vertical cable guides, respectively;

a first vertical cable guide mounted to the exterior of the housing on the first side and a second vertical cable guide mounted to the exterior of the housing on the second side, the first and second sides including cable access openings allowing cables to extend from the interior of the housing into the first and second vertical cable guides, respectively;

a telecommunications equipment rack including a first vertical support and a second vertical support spaced apart from one another, the first and second vertical supports including mounting openings;

a slack storage panel mounted the equipment rack and adjacent the first vertical support, the panel including an inner edge which includes mounting openings which cooperate with the mounting openings of the second vertical support to define a plurality of mounting locations adapted to receive the connection module, the slack storage panel including a plurality of spools providing a plurality of cable storage paths of different lengths;

the connection module mounted to one of the mounting locations.

19. The telecommunications connection system of claim 18, wherein the connection module is a first connection module and a plurality of additional connection modules are mounted to the mounting locations, the first vertical cable guide of each connection module cooperating to define a first vertical cable channel and the second vertical cable guide of each connection module cooperating to define a second vertical cable channel.

20. The telecommunications connection system of claim 18, wherein the connection locations are adapted to receive and optically connect a first telecommunications cable and a second telecommunications cable, the first and second cables being optical fiber cables.

21. The telecommunications connection system of claim 20, wherein each of the first and second telecommunications cables contain a plurality of optical fibers and the connection locations allow each optical fiber within the first cable to be optically connected to an optical fiber within the second cable.

22. A method of connecting a telecommunications cable comprising the steps of:

providing a housing including a first side wall and a second opposing side wall, a rear wall, a top and a bottom cooperating to define an interior with an open end with a bulkhead including a plurality of connection locations pivotably mounted within the open end, the bulkhead pivotable between an open position allowing access into the interior and a closed position blocking access into the interior;

pivoting the bulkhead to the open position;

extending an end of the cable into the interior of the housing through an opening in the first side wall;

placing the cable into a cable route defined by a cable guide structure in the interior of the housing, the cable guide structure extending along an interior side of the first side wall, an interior side of the rear wall and an interior side of the second side wall, the cable exiting the cable route along the second side wall proximate an axis extending from the bottom to the top, about which the bulkhead pivots;

directing the cable from the cable route into a cable management structure mounted to the bulkhead and movable with the bulkhead, the cable management structure including a plurality of cable paths of different lengths;

selecting at least one of the cable paths and placing the cable within the selected cable paths;

directing the end of the cable to one of the connection locations on the bulkhead and connecting the end to the connection location;

pivoting the bulkhead to the closed position.

23. The method of claim 22, wherein the cable guide structure in the interior of the housing provides bend radius protection to the telecommunications cable.

24. The method of claim 22, wherein the cable management structure on the bulkhead ad includes a plurality of spools defining the cable paths.

25. The method of claim 22, wherein the telecommunications cable is an optical fiber cable.

26. The method of claim 25, wherein the optical fiber cable is a ribbon cable including multiple optical fibers and the cable management structure allows the optical fiber cable to be placed in the selected cable path without twisting.

27. The method of claim 22, further comprising the steps of:

connected an end of a second telecommunications cable to the connection location on an opposite side of the bulkhead from the end of the first cable; and extending the second cable from the connection location through an opening in the second side wall.

* * * * *

UNITED STATES PATENT AND TRADEMARK OFFICE
CERTIFICATE OF CORRECTION

| | | |
|---|---|---|
| PATENT NO. | : 6,850,685 B2 | Page 1 of 2 |
| APPLICATION NO. | : 10/109576 | |
| DATED | : February 1, 2005 | |
| INVENTOR(S) | : Thomas Tinucci and Wayne Giesen | |

It is certified that error appears in the above-identified patent and that said Letters Patent is hereby corrected as shown below:

On the title page under Abstract line 8, it should read --"supports of the rack".--; patent omits the "."

On the title page under Abstract line 17, "to a and" should read --to and--

Column 4
Line 35, "comer" should read -- "corner" --

Column 7
Line 14, "ale" should read -- "are" --

Column 7
Line 24, "to the fi side" should read -- "to the first side" --

Column 7
Line 45, "arc" should read -- "are" --

Column 7
Line 49, "cable" should read -- "cables" --

Column 7
Line 65, "exterior," should read -- "exterior;" --

Column 8
Line 56, "exterior:" should read -- "exterior;" --

Column 9
Line 10, "a first vertical" should be the start of a new paragraph

Column 9
Line 29, "mounted the equipment" should read -- mounted to the equipment--

Column 10
Line 37, "bulkhead ad includes" should read --bulkhead includes--

UNITED STATES PATENT AND TRADEMARK OFFICE
CERTIFICATE OF CORRECTION

| | |
|---|---|
| PATENT NO. | : 6,850,685 B2 |
| APPLICATION NO. | : 10/109576 |
| DATED | : February 1, 2005 |
| INVENTOR(S) | : Thomas Tinucci and Wayne Giesen |

It is certified that error appears in the above-identified patent and that said Letters Patent is hereby corrected as shown below:

Column 10
Line 48, "connected" should read --connecting--

Signed and Sealed this

Eighteenth Day of September, 2007

JON W. DUDAS
*Director of the United States Patent and Trademark Office*